United States Patent
Li et al.

(10) Patent No.: US 8,525,025 B2
(45) Date of Patent: Sep. 3, 2013

(54) HIGH VOLTAGE DIRECT CURRENT CABLE TERMINATION APPARATUS

(71) Applicants: Ming Li, Vasteras (SE); Markus Saltzer, Fislisbach (CH); Uno Gafvert, Vasteras (SE); Cecilia Forssen, Vasteras (SE); Mikael Unge, Vasteras (SE); Lise Donzel, Wettingen (CH)

(72) Inventors: Ming Li, Vasteras (SE); Markus Saltzer, Fislisbach (CH); Uno Gafvert, Vasteras (SE); Cecilia Forssen, Vasteras (SE); Mikael Unge, Vasteras (SE); Lise Donzel, Wettingen (CH)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/679,501

(22) Filed: Nov. 16, 2012

(65) Prior Publication Data
US 2013/0078836 A1    Mar. 28, 2013

Related U.S. Application Data

(63) Continuation of application No. PCT/EP2010/057060, filed on May 21, 2010.

(51) Int. Cl.
*H01R 9/05* (2006.01)
(52) U.S. Cl.
USPC .......................................................... 174/73.1
(58) Field of Classification Search
USPC ............................................. 174/73.1, 74 R
See application file for complete search history.

(56) References Cited

U.S. PATENT DOCUMENTS

| | | | | |
|---|---|---|---|---|
| 4,738,318 | A | | 4/1988 | Boettcher et al. |
| 5,406,030 | A | * | 4/1995 | Boggs ........................... 174/73.1 |
| 6,124,549 | A | * | 9/2000 | Kemp et al. ................... 174/73.1 |
| 6,265,663 | B1 | * | 7/2001 | Cicogna et al. ............... 174/73.1 |
| 6,333,462 | B1 | * | 12/2001 | Quaggia ...................... 174/74 R |
| 6,677,528 | B2 | * | 1/2004 | Amerpohl et al. ............ 174/73.1 |
| 6,818,828 | B2 | * | 11/2004 | Quaggia ...................... 174/74 R |
| 7,170,004 | B2 | * | 1/2007 | Gramespacher et al. .... 174/73.1 |

(Continued)

FOREIGN PATENT DOCUMENTS

| | | |
|---|---|---|
| DE | 3822288 A1 | 1/1990 |
| DE | 19845006 C1 | 4/2000 |

(Continued)

OTHER PUBLICATIONS

International Search Report and Written Opinion of the International Searching Authority Application No. PCT/EP2010/057060 Completed: Feb. 28, 2012 Mailing Date: Mar. 19, 2012 11 pages.

(Continued)

*Primary Examiner* — Timothy Thompson
*Assistant Examiner* — Amol Patel
(74) *Attorney, Agent, or Firm* — St. Onge Steward Johnston & Reens LLC (57) ABSTRACT

A direct current cable termination apparatus for terminating a high voltage direct current cable. The apparatus includes a current-carrying device including a terminal portion of the direct current cable, the cable including an electrical conductor, an electrically insulating layer located outside of the electrical conductor, and a conductive shield located outside of the insulating layer and the electrical conductor; and a housing including a tubular outer shell with an inner periphery and formed by an electrically insulating and polymer-containing material. The current-carrying device is adapted to extend in the axial direction of the outer shell. Along at least a part of the axial extension of the current-carrying device the outer shell extends axially with a space between its inner periphery and the current-carrying device.

23 Claims, 2 Drawing Sheets

(56) References Cited

U.S. PATENT DOCUMENTS

| | | |
|---|---|---|
| 7,262,367 B2 | 8/2007 | Donzel et al. |
| 7,361,836 B2 * | 4/2008 | Goehlich .................... 174/74 R |
| 7,495,172 B2 | 2/2009 | Amerpohl |
| 2007/0272428 A1 * | 11/2007 | Bayon et al. ................. 174/73.1 |
| 2008/0152898 A1 * | 6/2008 | Donzel et al. ................. 428/323 |
| 2009/0071684 A1 | 3/2009 | Zhang |
| 2010/0288527 A1 * | 11/2010 | Lichy ........................... 174/73.1 |
| 2013/0075124 A1 * | 3/2013 | Li et al. ........................... 174/19 |
| 2013/0081844 A1 * | 4/2013 | Li et al. ........................... 174/20 |
| 2013/0081851 A1 * | 4/2013 | Li et al. ...................... 174/73.1 |

FOREIGN PATENT DOCUMENTS

| | | |
|---|---|---|
| EP | 1736998 A1 | 12/2006 |
| EP | 2026438 A1 | 2/2009 |
| FR | 2518837 A1 | 6/1983 |
| JP | 2005033930 A | 2/2005 |
| WO | 2004038735 A1 | 5/2004 |
| WO | 2006015735 A1 | 2/2006 |
| WO | 2007147755 A1 | 12/2007 |
| WO | 2008076058 A1 | 6/2008 |
| WO | 2008119782 A1 | 10/2008 |

OTHER PUBLICATIONS

Written Opinion of the International Preliminary Examining Authority Application No. PCT/EP2010/057060 Mailing Date: Jul. 25, 2012 8 pages.

* cited by examiner

Fig. 1

Fig. 2 and being electrically connected to ground potential.

HIGH VOLTAGE DIRECT CURRENT CABLE TERMINATION APPARATUS

FIELD OF THE INVENTION

The present invention relates to a direct current cable termination apparatus for terminating a high voltage direct current, HVDC, cable. The apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor. The apparatus comprises a housing comprising a tubular outer shell with an inner periphery, the outer shell defining a longitudinal axis and being formed by an electrically insulating and polymer-containing material, and the current-carrying device is adapted to extend in the axial direction of the outer shell. Along at least a part of the axial extension of the current-carrying device the outer shell extends axially with a space between its inner periphery and the current-carrying device, and the housing is adapted to separate the space from an atmosphere outside the outer shell, and the space is filled with an electrically insulating fluid. The outer shell has a first end portion and a second end portion, and the apparatus comprises at least one electric field control member located at a first axial range from the first end portion of the outer shell and at a second axial range from the second end portion of the outer shell. Further, the present invention relates to an electric installation comprising an apparatus of the above-mentioned kind.

BACKGROUND OF THE INVENTION

Today, the level of the rated voltage of high voltage direct current, HVDC, applications is increased in the technical field of HVDC. With this development, improved HVDC cable terminations, which can withstand higher voltage levels, are preferred.

A HVDC cable is used for power supply in power distribution networks and power transmission networks. Generally, the HVDC cable comprises at least an inner or central live electrical conductor, e.g. made of copper or aluminium, an electrically insulating layer which circumferentially surrounds the electrical conductor, and a conductive shield, also called outer semicon, which circumferentially surrounds the insulating layer and the electrical conductor, the conductive shield being held on ground potential. Additional layers may be provided, e.g. a so called inner semicon, which is a conductive layer circumferentially surrounding the electrical conductor and located inside of the insulating layer, and an outer cable jacket circumferentially surrounding the conductive shield.

When the HVDC cable is electrically connected to other electric equipment, the HVDC cable is terminated or cut off. When terminating a HVDC cable, measures should be taken to ensure durable and reliable electrical performance and to protect the connection between the end of the HVDC cable and the electric equipment to which the end of cable is connected. When terminating a HVDC cable, the conductive shield and the electrically insulating layer, and possibly any further present layers, are terminated, or cut off, prior to the termination of the inner electrical conductor in order to expose the electrical conductor and connect it to the electric equipment.

WO2007/147755-A1 discloses a cable termination for terminating a HVDC cable, the termination being provided with a device for electric field control including a field grading material layer adapted to be electrically connected to a live high voltage part and electrically connected to ground potential.

US2009/0071684-A1 describes a high voltage power cable termination.

WO2006/015735-A1 discloses an open-air cable sealing end for a high-voltage cable, comprising an outer shell and an electrically conducting connecting line, the outer shell extending axially with a space between its inner periphery and the connecting line, and the space is filled with an electrically insulating gas, e.g. sulphur hexafluoride, $SF_6$.

SUMMARY OF THE INVENTION

One object of the present invention is to provide an improved high voltage direct current, HVDC, cable termination, which may withstand high voltage levels. It is a further object of the present invention to improve the electric insulation properties of a HVDC cable termination. It is also an object of the present invention to improve the mechanical performances of a HVDC cable termination.

The above-mentioned objects of the present invention are attained by providing a direct current cable termination apparatus for terminating a high voltage direct current cable (a DC cable for voltages at e.g. 50 kV and above), the apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor, a housing comprising a tubular outer shell with an inner periphery, the outer shell defining a longitudinal axis and being formed by an electrically insulating and polymer-containing material, the current-carrying device being adapted to extend in the axial direction of the outer shell, along at least a part of the axial extension of the current-carrying device the outer shell extends axially with a space between its inner periphery and the current-carrying device, the housing is adapted to separate the space from an atmosphere outside the outer shell, and the space is filled with an electrically insulating fluid, the outer shell has a first end portion and a second end portion, the apparatus comprises at least one electric field control member located at a first axial range from the first end portion of the outer shell and at a second axial range from the second end portion of the outer shell, wherein the conductive shield terminates inside the outer shell, the electric field control member is provided inside the outer shell and in the proximity of the termination of the conductive shield, a first part of the terminal portion of the cable has the circumferential conductive shield, whereas a remainder part of the terminal portion of the cable has the conductive shield removed, the first and remainder parts being located inside the outer shell and the first part being situated outside the first axial range, and the apparatus comprises at least one field grading material layer positioned around the current-carrying device, the at least one field grading material layer extending axially inside the outer shell and being electrically connected to the conductive shield of the terminal portion of the cable and electrically connectable to the electrical conductor of the terminal portion of the cable.

Generally, the first end portion may be adjacent to the high voltage side, e.g. an overhead line, or the electric equipment to which the cable is to be connected, and the cable enters the termination apparatus via the second end portion.

The at least one field grading material layer may comprise one or more layers, which is/are directly, or indirectly, electrically connected, or connectable, to the conductive shield and the electrical conductor, respectively. The at least one field grading material layer may be directly, or indirectly, physically connected, or connectable, to the conductive shield and the electrical conductor, respectively.

A field grading material is a material adapted to grade or to guide the electric field. Examples of so called field grading material, FGM, which can be used for the present invention are for example mentioned in WO-A1-2008/076058 and EP-A1-1 736 998. However, other suitable FGM may also be used.

The circumferential conductive shield, also called outer semicon or screen, terminates inside the outer shell and forms a termination in the form of a circumferential edge (also called semicon edge). The inventors of the present invention have identified the termination of the circumferential conductive shield, also called outer semicon, which generally is held on ground potential, as a main problem zone, where the highest electric field and electric field stress is found. This is also the reason for providing an electric field control member, e.g. a so called stress cone, in the proximity of the termination of the conductive shield, which is a prior art measure. By providing the at least one FGM layer, an efficient control of the electric field and a reduction of the electric field stress may be attained, and the cable termination according to the present invention is more flexible and may be tailored in an efficient way to various applications. By providing the at least one FGM layer, the electric stress under impulse test voltages is geometrically graded in an efficient way. With reference to the above, an improved cable termination for high voltage is provided, which withstands higher voltage levels, and where the electric insulation properties and the mechanical performances are improved.

The insulating fluid may be in the form of a liquid, e.g. oil or gel, a gas, or a gas mixture etc.

The electrically insulating and polymer-containing material of the outer shell may comprise one polymer or a plurality of polymers. The material may be a composite, a reinforced epoxy or a resin. The polymer can be a thermoplastic polymer, e.g. polybutylene terephthalate (PBT) or polyester, or a thermosetting polymer, e.g. thermosetting resin. The shell may be in the form of an epoxy reinforced structure. According to an advantageous embodiment of the apparatus according to the present invention, the outer shell is formed by a polymer or a plurality of polymers. The outer shell may be provided with an outer cover of silicone, e.g. in the form of sheds, or wings.

Advantageously, the electric field control member is positioned around the current-carrying device. There are several known electric field control members which may be used and are known to the person skilled in the art, and the electric field control member is therefore not discussed in more detail hereinafter. The electric field control member may for example be a stress cone, and may for example comprise a rubber or elastomeric body stretched over the current-carrying device, and an earth electrode may be applied to the rubber body to distribute the electric field, or the equipotential lines between the high voltage side and earth, to prevent electric field stress and electric field concentrations.

The DC cable may comprise further layers, e.g. an outer cable jacket circumferentially surrounding the conductive shield, which is known to the skilled person and thus not discussed in more detail hereinafter.

According to an advantageous embodiment of the apparatus according to the present invention, the current-carrying device comprising a terminal portion of a High Voltage Direct Current, HVDC, cable. Generally, the conductive shield is held on ground potential.

The apparatus according to the present invention is especially advantageous for terminating DC cables for voltages above 200 kV.

According to an advantageous embodiment of the apparatus according to the present invention, the at least one field grading material layer is positioned around and outside of the electrically insulating layer of the terminal portion of the cable. Hereby, an improved cable termination for high voltage is provided.

According to a further advantageous embodiment of the apparatus according to the present invention, the at least one field grading material extends at least along the first axial range. Hereby, an improved cable termination for high voltage is provided.

According to another advantageous embodiment of the apparatus according to the present invention, the fluid comprises an electrically insulating gas. The insulating gas may be a gas mixture. Insulating gas, e.g. $SF_6$, $N_2$ or $CO_2$, is easy to handle on site, has a low weight and has an advantageous convection cooling effect. By this embodiment, an improved HVDC cable termination is provided.

According to yet another advantageous embodiment of the apparatus according to the present invention, the electrically insulating gas comprises $SF_6$, i.e. sulphur hexafluoride, $CO_2$ and/or $N_2$. By this embodiment, the insulation properties and the electric field control of the HVDC cable termination are further improved, providing a further improved HVDC cable termination. The electrically insulating gas may also comprise air, e.g. compressed air.

According to still another advantageous embodiment of the apparatus according to the present invention, the electric field control member is situated between the terminal portion of the cable and the at least one field grading material layer. By this embodiment, the electric field control is further improved, whereby a further improved HVDC cable termination is provided.

According to an advantageous embodiment of the apparatus according to the present invention, the electric field control member has an outer surface facing the space of the outer shell, and at least a portion of the outer surface of the electric field control member forms part of the at least one field grading material layer. By this embodiment, the electric field control is further improved, whereby a further improved HVDC cable termination is provided.

According to a further advantageous embodiment of the apparatus according to the present invention, the apparatus comprises a conducting or semiconducting layer which electrically connects the at least one field grading material layer to the conductive shield of the terminal portion of the cable. By this embodiment, the electric field control is further improved, whereby a further improved HVDC cable termination is provided. Alternatively, the conducting or semiconducting layer may be embedded in the material of the electric field control member.

According to another advantageous embodiment of the apparatus according to the present invention, the electric field control member is provided with at least a part of the conducting or semiconducting layer. By this embodiment, the electric field control is further improved, whereby a further improved HVDC cable termination is provided.

According to still another advantageous embodiment of the apparatus according to the present invention, a first part of the outer surface of the electric field control member forms part of the at least one field grading material layer, and a remainder part of the outer surface of the electric field control member forms at least a part of the conducting or semiconducting layer. By this embodiment, the electric field control is further improved, whereby a further improved HVDC cable termination is provided.

According to yet another advantageous embodiment of the apparatus according to the present invention, within the first axial range the current-carrying device has a first outer surface which extends from the electric field control member to the first end portion of the outer shell, and at least a portion of the first outer surface of the current-carrying device forms part of the at least one field grading material layer. By this embodiment, the electric field control is further improved, whereby a further improved HVDC cable termination is provided.

According to an advantageous embodiment of the apparatus according to the present invention, substantially the entire first outer surface of the current-carrying device forms part of the at least one field grading material layer. By this embodiment, the electric field control is further improved.

According to a further advantageous embodiment of the apparatus according to the present invention, the remainder part of the terminal portion of the cable extends from the termination of the conductive shield to the first end portion of the outer shell. By this embodiment, the electric field control is further improved.

According to another advantageous embodiment of the apparatus according to the present invention, the electrical conductor of the terminal portion of the cable is terminated outside of the outer shell. By this embodiment, the electric field control is further improved.

Alternatively, the current-carrying device may comprise a connecting body positioned within the outer shell and in which the electrical conductor terminates, the connecting body may be adapted to electrically connect the terminated electrical conductor to an electrically conducting member adapted to extend axially in the first range and to form part of the current-carrying device. The connecting body may comprise connecting elements which connect the terminated electrical conductor to the conducting member and may comprise screws and a static conductive screen/shield. The conducting member may be in the form of a rod, e.g. made of aluminium or copper. Having a bare conducting member in the space of the outer shell, which is gas-filled, e.g. with $SF_6$, is of benefit to the thermal performance of the DC cable termination.

According to yet another advantageous embodiment of the apparatus according to the present invention, the electrically insulating layer of the terminal portion of the cable is terminated outside of the outer shell. By this embodiment, the electric field control is further improved.

According to still another advantageous embodiment of the apparatus according to the present invention, the at least one field grading material layer comprises a nonlinear field grading material. Advantageously, the at least one field grading material layer comprises a resistive field grading material. Advantageously, the at least one field grading material layer comprises a nonlinear resistive field grading material with a resistivity which is a function of the electric field. Alternatively, a capacitive field grading material with field dependent permittivity may be used. By these embodiments, the electric field control is further improved, and a further improved HVDC cable termination is provided.

According to an advantageous embodiment of the apparatus according to the present invention, the apparatus comprises a partition which separates the space into a first chamber and a second chamber and separates the second chamber from the electrically insulating fluid which fills the first chamber, where the partition is physically connected to the electric field control member and is adapted to separate the first part of the terminal portion of the cable from the first chamber. The second chamber may be filled with a second fluid different from the fluid of the first chamber, e.g. a liquid fluid, e.g. comprising an electrically insulating gel and/or oil. When entering the outer shell of the apparatus, the terminal portion of the DC cable still has the earthed circumferential conductive shield. Thus, during operation, the terminal portion of the DC cable thermally expands and contracts in the radial direction at the interface between cable and the cable entry/opening of the outer shell, which may cause problems with regard to the sealing between the cable and the outer shell. However, by providing a liquid fluid in the second chamber into which the cable enters the outer shell, instead of a gas, which would more easily leak via the interface between the cable and the outer shell, an improved sealing at the cable entry of the outer shell is provided. Consequently, the sealing arrangement at the cable entry of the outer shell may be less sophisticated and thus less expensive in relation to prior art sealing. Thus, the apparatus according to this embodiment is easier to manufacture. By this embodiment, an improved HVDC cable termination is provided, where the electric insulation properties and the mechanical performances are improved. Further, the liquid filler provides cooling of the terminal portion of the DC cable.

According to a further advantageous embodiment of the apparatus according to the present invention, the partition is tubular and is positioned around the terminal portion of the cable. By this embodiment, the partition is efficiently seated in a correct and effective position, and the assembly of the apparatus is facilitated, whereby an improved HVDC cable termination is provided.

According to another advantageous embodiment of the apparatus according to the present invention, the partition forms a cylinder-shaped inner shell having a first rim physically connected to the electric field control member. By this embodiment, the partition is efficiently seated in a correct and effective position, whereby an improved HVDC cable termination is provided.

According to yet another advantageous embodiment of the apparatus according to the present invention, along at least a part of the axial extension of the partition the outer shell extends axially with a gap between its inner periphery and the partition. By this embodiment, the electric field control is further improved.

According to still another advantageous embodiment of the apparatus according to the present invention, the partition has an inner periphery, and along at least a part of the axial extension of the current-carrying device the partition extends axially with a gap between its inner periphery and the current-carrying device. By this embodiment, the electric field control is further improved.

According to an advantageous embodiment of the apparatus according to the present invention, the partition has a periphery which is electrically conductive. By this embodiment, the electric field control is further improved.

According to an advantageous embodiment of the apparatus according to the present invention, the at least one field grading material layer has a varying thickness along the axial extension of the current-carrying device. By this embodiment, one may take into account of the change in the electric field along the axial extension of the current-carrying device, and the at least one field grading material layer may be efficiently tailored to different HVDC applications, providing a further improved electric field control.

According to a further advantageous embodiment of the apparatus according to the present invention, the at least one field grading material layer is based on a tape. Hereby, the assembly of the apparatus is further facilitated, providing an improved HVDC cable termination.

According to another advantageous embodiment of the apparatus according to the present invention, the at least one field grading material layer is based on a sleeve. Hereby, the assembly of the apparatus is further facilitated, providing an improved HVDC cable termination. Alternatively, the at least one field grading material layer may be in the form of a coating or a painted layer applied to the current-carrying device.

According to yet another advantageous embodiment of the apparatus according to the present invention, the electric field control member has an inner periphery facing the current-carrying device, and the electric field control member is positioned around the current-carrying device with the at least one field grading material layer between its inner periphery and the current-carrying device. By this embodiment, the application of the at least one field grading material layer may be efficiently tailored to each HVDC application, providing a further improved electric field control. This embodiment is advantageously combined with the embodiment which has at least a portion of the outer surface of the electric field control member forming part of the at least one field grading material layer.

Advantageously, along at least a part of the first part of the terminal portion of the cable the at least one field grading material layer may extend axially and may be positioned around at least the circumferential conductive shield of the terminal portion of the cable.

Further, the above-mentioned objects of the present invention are attained by providing an electric installation, comprising a high voltage direct current cable which at least comprises an electrical conductor, a circumferential insulating layer located outside of the electrical conductor, and a circumferential conductive shield located outside of the insulating layer and the electrical conductor, and comprising a direct current cable termination apparatus for terminating the cable, wherein the apparatus comprises the features of a direct current cable termination apparatus, and/or the features of any of the above-mentioned embodiments of the apparatus. Positive technical effects of the electric installation according to the present invention, and its embodiments, correspond to the above-mentioned technical effects mentioned in connection with the apparatus according to the present invention, and its embodiments.

The above-mentioned embodiments and features of the direct current cable termination apparatus and the electric installation, respectively, may be combined in various possible ways providing further advantageous embodiments.

Further advantageous embodiments of the direct current cable termination apparatus and the electric installation, respectively, according to the present invention and further advantages with the present invention emerge from the detailed description of embodiments.

BRIEF DESCRIPTION OF THE DRAWINGS

The present invention will now be described, for exemplary purposes, in more detail by way of embodiments and with reference to the enclosed drawings, in which.

DETAILED DESCRIPTION OF THE INVENTION

Figure 1:
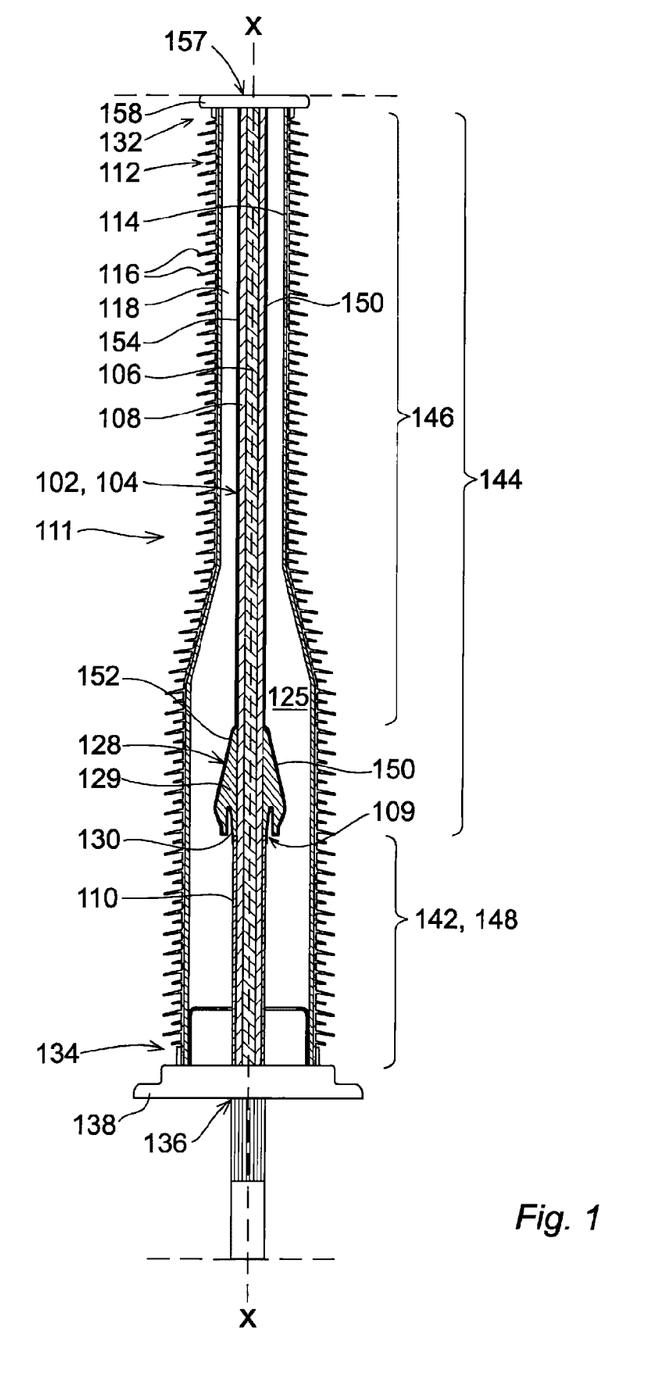
FIG. 1 is a schematic side view showing a longitudinal section of a first embodiment of the direct current cable termination apparatus according to the present invention.
Figure 2:
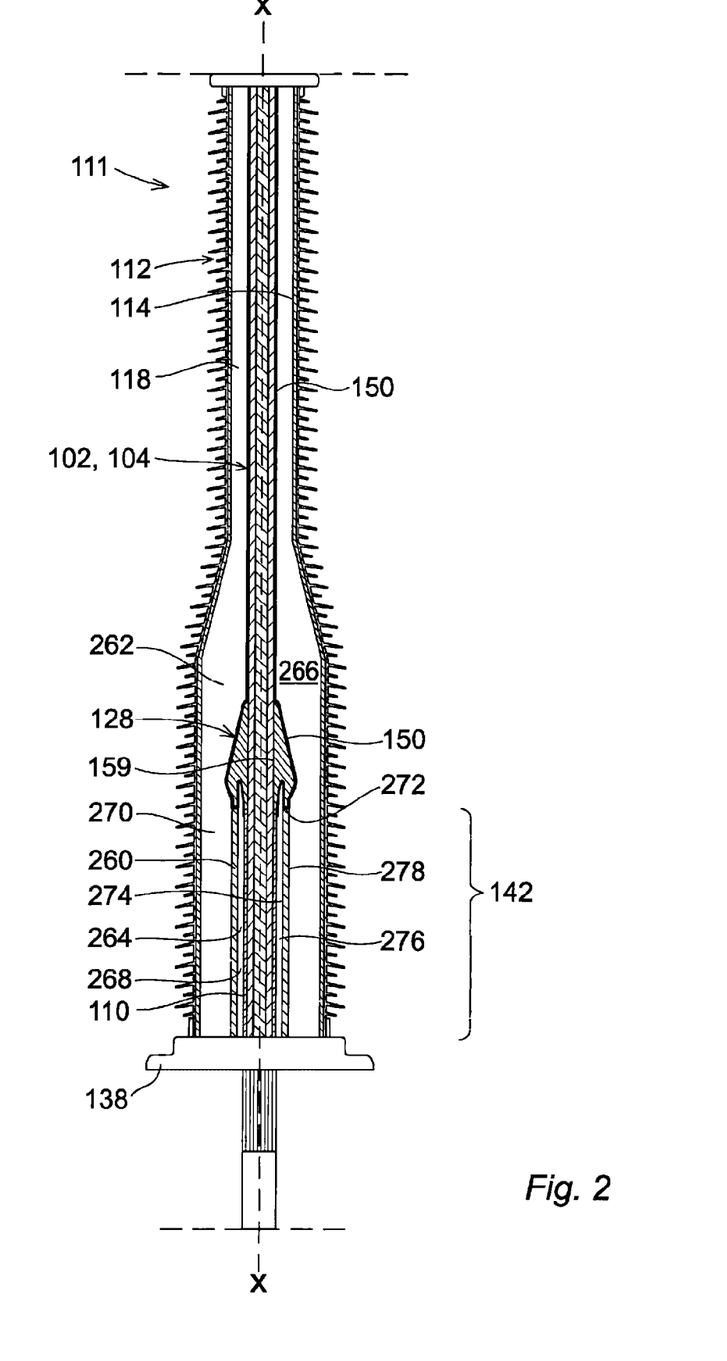
FIG. 2 is a schematic side view showing a longitudinal section of a second embodiment of the direct current cable termination apparatus according to the present invention.

FIGS. 1 and 2 schematically shows two embodiments of the direct current cable termination apparatus according to the present invention, for terminating a HVDC cable for high voltage (e.g. 10 kV and above, especially 50 kV and above). With reference to FIGS. 1 and 2, each of the embodiments of the apparatus comprises a current-carrying device 102, or a voltage-carrying device, comprising a terminal portion 104 of the HVDC cable, the cable at least comprising a central live electrical conductor 106, generally made of a suitable metal, e.g. copper or aluminium, a circumferential electrically insulating layer 108 which circumferentially surrounds and is located outside of the electrical conductor 106, and a circumferential conductive shield 110, or layer/screen, also called outer semicon, which circumferentially surrounds and is located outside of the insulating layer 108 and the electrical conductor 106. The circumferential conductive shield 110 may be made of an electrically conducting polymer. The structure of a HVDC cable and its parts, which may comprise further layers, is well known to the skilled person and thus not discussed in more detail herein. The HVDC cable may e.g. comprise a so called inner semicon, which is a layer/screen circumferentially surrounding the electrical conductor and being located inside of the insulating layer. The inner semicon may be made of an electrically conducting polymer.

Further, the apparatus comprises a housing 111 which comprises a tubular outer shell 112 with an inner periphery 114. The outer shell 112 defines a longitudinal axis x-x and is formed by an electrically insulating and polymer-containing material, e.g. a composite. The apparatus is substantially rotation symmetric around the axis x-x. The outer periphery of the outer shell 112 is provided with sheds 116, or lips/wings, for example made of silicone. The current-carrying device 102 is adapted to extend in the axial direction of the outer shell 112. Along at least a part of the axial extension of the current-carrying device 102 the outer shell 112 extends axially with a space 118 between its inner periphery 114 and the outer periphery of current-carrying device 102. The housing 111 is adapted to separate the space 118 from an atmosphere outside 120 the outer shell 112. The conductive shield 110 terminates inside the outer shell 112. The conductive shield 110 is terminated and forms a termination 109 in the form of a circumferential edge (also called semicon edge). The apparatus includes an electric field control member 128, e.g. in the form of a stress cone as previously disclosed, located inside the outer shell 112 and in the proximity of the termination of the conductive shield 110, and is positioned around the current-carrying device 102. The electric field control member 128 may comprise a rubber, polymeric or elastomeric body 129 stretched, or pushed, over the current-carrying device 102, more precisely the terminal portion 104 of the HVDC cable. The elastomeric body 129 may be mushroom-shaped. However, other materials and shapes of the elastomeric body 129 are possible. Other types of electric field control members known to the skilled person may also be used. The apparatus may also include a plurality of electric field control members, i.e. two or several electric field control members. The electric field control member could also be in the form of a linear or non-linear resistive field grading material layer, e.g. in the form of a sleeve made of a non-linear resistive material. Further, the electric field control member 128 may comprise a semiconducting, or conductive, layer 130, e.g. made of metal or a polymer material, which in conventional ways is provided on the lower inner curved periphery of the elastomeric body 129. Alternatively, the semiconducting, or conductive, layer 130 may be embedded in the body 129 of the electric field control member 128. The semiconducting, or conductive, layer 130 may be formed and composed in various ways known to the skilled person. The conductive layer 130 may be called deflector. Advantageously, the conductive shield 110 terminates adjacent to the lower part of the electric field control member 128, below, or prior to, the triple point which is formed by the insulating material of the electric field control member 128, the insulating material of the electrically insulating layer 108 of the terminal portion 104 of the cable and the material of the semiconducting layer 130.

The outer shell 112 has a first end portion 132 adjacent to the high voltage side, where the apparatus is connected to e.g. an overhead line or bus bar etc. The outer shell 112 has a second end portion 134 via which the HVDC cable enters the outer shell 112. The housing 111 may comprise a first flange 138, e.g. made of a metal, at the second end portion 134 of the outer shell 112, and a second flange 158, e.g. made of a metal, at the first end portion 132 of the outer shell 112. The cable enters the outer shell 112 via a first opening 136 defined by the first flange 138. The electrically insulating layer 108 and the electrical conductor 106 of the terminal portion 104 of the cable exit the outer shell 112 via a second opening 157 defined by the second flange 158 and are terminated outside 120 of the outer shell 112, for connection of the electrical conductor 106 to electric equipment of the high voltage side. A first part 142 of the terminal portion 104 of the cable has the circumferential conductive shield 110, whereas a remainder part 144 of the terminal portion 104 of the cable has the conductive shield 110 removed, such that the insulating layer 108 is exposed. The first part 142 may be called semicon end and the remainder part 144 may be called stripped cable. The first and remainder parts 142, 144 of the terminal portion 104 of the cable are located inside the outer shell 112. The remainder part 144 of the terminal portion 104 of the cable extends from the termination of the conductive shield 110 to the first end portion 132 of the outer shell 112. The first part 142, with the conductive shield 110 present, is situated between the second end portion 134 and the electric field control member 128. The electric field control member 128 is located at a first axial range 146 from the first end portion 132 of the outer shell 112 and at a second axial range 148 from the second end portion 134 of the outer shell 112. The first part 142 of the terminal portion 104 of the cable is situated outside the first axial range 146 and within the second axial range 148. Along the axial extension of the electric field control member 128 the outer shell 112 extends axially with a space 118 between its inner periphery 114 and the outer periphery of the electric field control member 128.

The apparatus comprises at least one circumferential field grading material layer, FGM, 150 positioned around the current-carrying device 102, more precisely in this embodiment, around the remainder part 144 of the terminal portion 104 of the cable, which has the conductive shield 110 removed. The at least one FGM layer 150 is electrically connected to the conductive shield 110 of the terminal portion 104 of the cable by being electrically connected to the semiconducting layer 130 which in turn is electrically connected to the conductive shield 110. The at least one FGM layer 150 is electrically connectable to the electrical conductor 106 of the terminal portion 104 of the cable. In the disclosed embodiments, the FGM layer 150 may be electrically connected, indirectly or directly, to the electrical conductor 106 outside 120 of the outer shell 112 by conventional connection means.

The at least one field grading material layer 150 is herein made of a nonlinear FGM, e.g. a resistive field grading material with a field dependent electrical resistivity, e.g. in the form of a SiC or ZnO filler in a suitable polymer base. The FGM layer 150 has a varying thickness along the axial extension of the current-carrying device 102. Reference is made to WO-A1-2008/076058 and EP-A1-1 736 998 for examples of FGM which may used. However, other suitable FGM may also be used.

The at least one FGM layer 150 extends axially inside the outer shell 112 and extends axially from the semiconducting layer 130 to the first end portion 132 of the outer shell 112. The FGM layer 150 extends axially at least along the first axial range 146, and is positioned around and outside of the electrical conductor 106 and the electrically insulating layer 108 of the terminal portion 104 of the cable. The electric field control member 128 is situated between the terminal portion 104 of the cable and the at least one FGM layer 150. The electric field control member 128 has an outer surface 152 facing the space 118 of the outer shell 112. A first part of the outer surface 152 of the electric field control member 128 forms part of the at least one FGM layer 150, and a remainder part of the outer surface 152 of the electric field control member 128 forms at least a part of the semiconducting layer 130. Within the first axial range 146 the current-carrying device 102 has a first outer surface 154 which extends from the electric field control member 128 to the first end portion 132 of the outer shell 112, and the first outer surface 154 of the current-carrying device 102 forms part of the at least one FGM layer 150.

The FGM layer, or FGM layers, may be applied to the apparatus in various ways, e.g. in the form of a tape wound around the current-carrying device, in the form of a sleeve positioned around the current-carrying device, or in the form a coating or a painted layer applied to the current-carrying device.

The space 118 of the first embodiment of FIG. 1 is filled with an electrically insulating fluid 125 in the form of an electrically insulating gas, e.g. $SF_6$ or $N_2$, or a mixture thereof.

The second embodiment of FIG. 2 comprises a tubular partition 260 which is positioned around the current-carrying device 102, more precisely around the terminal portion 104 of the cable, and separates the space 118 into a first chamber 262 and a second chamber 264. The partition 260 may be made of an electrically insulating and polymer-containing material, for example glass fibre reinforced epoxy. The first chamber 262 is filled with an electrically insulating first fluid 266 in the form of an electrically insulating gas, e.g. $SF_6$ or $N_2$, or a mixture thereof. The conductive shield 110 terminates inside the second chamber 264, and the electric field control member 128 is located within the second chamber 264. The second chamber 264 may be filled with an electrically insulating second fluid 268 in the form of an electrically insulating gel or an electrically insulating oil, or a mixture thereof. Along at least a part of the axial extension of the partition 260 the outer shell 112 extends axially with a gap 270 between its inner periphery 114 and the outer periphery of the partition 260. The partition 260 is physically connected to the electric field control member 128 and is adapted to separate the first part 142 of the terminal portion 104 of the cable from the first chamber 262. The partition 260 forms a cylinder-shaped inner shell 260 having a first rim 272 physically and sealingly connected to the electric field control member 128. The partition 260 is connected in a sealing manner to the first flange 138. The partition 260 has an inner periphery 274, and along at least a part of the axial extension of the current-carrying device 102 the partition 260 extends axially with a gap 276 between its inner periphery 274 and the current-carrying device 102. The partition 260 has a periphery 274, 278 which may be electrically conductive.

The electric field control member 128 has an inner periphery 159 facing the current-carrying device 102, and according to further aspects of the apparatus according to the present invention, the electric field control member 128 may also be positioned around the current-carrying device 102 with at least one FGM layer between its inner periphery 159 and the current-carrying device 102. In other embodiments, further FGM layers may be provided, e.g. both outside of the electric field control member 128 and between the inner periphery 159 of the electric field control member 128 and the current-carrying device 102.

The invention shall not be considered limited to the embodiments illustrated, but can be modified and altered in many ways by one skilled in the art, without departing from the scope the appended claims.

What is claimed is:

1. A direct current cable termination apparatus for terminating a high voltage direct current cable, the apparatus comprises
    a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor,
    a housing comprising a tubular outer shell with an inner periphery the outer shell defining a longitudinal axis and being formed by an electrically insulating and polymer-containing material,
    the current-carrying device being adapted to extend in the axial direction of the outer shell,
    along at least a part of the axial extension of the current-carrying device the outer shell extends axially with a space between its inner periphery and the current-carrying device,
    the housing is adapted to the space from an atmosphere outside the outer shell, and the space is filled with an electrically insulating fluid
    the outer shell has a first end portion and a second end portion, the apparatus comprises at least one electric field control member located at a first axial range from the first end portion of the outer shell and at a second axial range from the second end portion of the outer shell, characterized in that
    the conductive shield terminates inside the outer shell,
    in that the electrical conductor of the terminal portion of the cable is terminated outside of the outer shell,
    in that the electrically insulating layer of the terminal portion of the cable is terminated outside of the outer shell,
    in that the electric field control member is provided inside the outer shell and in the proximity of the termination of the conductive shield,
    in that a first part of the terminal portion of the cable has the circumferential conductive shield, whereas a remainder part of the terminal portion of the cable has the conductive shield removed, the first and remainder parts being located inside the outer shell, and the first part being situated outside the first axial range, and
    in that the apparatus comprises at least one field grading material layer positioned around the current-carrying device, the at least one field grading material layer extending axially inside the outer shell and extending at least along the first axial range, and the at least one field grading material layer is electrically connected to the conductive shield of the terminal portion of the cable and electrically connected, indirectly or directly, to the electrical conductor outside of the outer shell.

2. The direct current cable termination apparatus according to claim 1, characterized in that the at least one field grading material layer is positioned around and outside of the electrically insulating layer of the terminal portion of the cable.

3. The direct current cable termination apparatus according to claim 1, characterized in that the fluid comprises an electrically insulating gas.

4. The direct current cable termination apparatus according to claim 3, characterized in that the gas comprises $SF_6$, $CO_2$ and/or $N_2$.

5. The direct current cable termination apparatus according to claim 1, characterized in that electric field control member is situated between the terminal portion of the cable and the at least one field grading material layer.

6. The direct current cable termination apparatus according to claim 1, characterized in that the electric field control member has an outer surface facing the space of the outer shell, and in that at least a portion of the outer surface of the electric field control member forms part of the at least one field grading material layer.

7. The direct current cable termination apparatus according to claim 6, characterized in that the apparatus comprises a conducting or semiconducting layer which electrically connects the at least one field grading material layer to the conductive shield of the terminal portion of the cable.

8. The direct current cable termination apparatus according to claim 7, characterized in that the electric field control member is provided with at least a part of the conducting or semiconducting layer.

9. The direct current cable termination apparatus according to claim 7, characterized in that a first part of the outer surface of the electric field control member forms part of the at least one field grading material layer, and in that a remainder part of the outer surface of the electric field control member forms at least a part of the conducting or semiconducting layer.

10. The direct current cable termination apparatus according to claim 1, characterized in that, within the first axial range the current-carrying device has a first outer surface which extends from the electric field control member to the first end portion of the outer shell, and in that at least a portion of the first outer surface of the current-carrying device forms part of the at least one field grading material layer.

11. The direct current cable termination apparatus according to claim 10, characterized in that substantially the entire first outer surface of the current-carrying device forms part of the at least one field grading material layer.

12. The direct current cable termination apparatus according to claim 1, characterized in that the remainder part of the terminal portion of the cable extends from the termination of the conductive shield to the first end portion of the outer shell.

13. The direct current cable termination apparatus according to claim 1, characterized in that the at least one field grading material layer comprises a nonlinear field grading material.

14. The direct current cable termination apparatus according to claim 1, characterized in that the at least one field grading material layer comprises a resistive field grading material.

15. The direct current cable termination apparatus according to claim 1, characterized in that the at least one field grading material layer comprises a nonlinear resistive field grading material with a resistivity which is a function of the electric field.

16. The direct current cable termination apparatus according to claim 1, characterized in that the apparatus comprises a partition which separates the space into a first chamber and a second chamber and separates the second chamber from the electrically insulating fluid which fills the first chamber, in that the partition is physically connected to the electric field control member and is adapted to separate the first part of the terminal portion of the cable from the first chamber.

17. The direct current cable termination apparatus according to claim 16, characterized in that the partition is tubular and is positioned around the terminal portion of the cable.

18. The direct current cable termination apparatus according to claim 17, characterized in that the partition forms a cylinder-shaped inner shell having a first rim physically connected to the electric field control member.

19. The direct current cable termination apparatus according to claim 16, characterized in that along at least a part of the axial extension of the partition the outer shell extends axially with a gap between its inner periphery and the partition.

20. The direct current cable termination apparatus according to claim 1, characterized in that the at least one field grading material layer has a varying thickness along the axial extension of the current-carrying device.

21. The direct current cable termination apparatus according to claim 1, characterized in that the at least one field grading material layer is based on a tape.

22. The direct current cable termination apparatus according to claim 1, characterized in that the at least one field grading material layer is based on a sleeve.

23. An electric installation, comprising a high voltage direct current cable which at least comprises an electrical conductor, a circumferential insulating layer located outside of the electrical conductor, and a circumferential conductive shield located outside of the insulating layer and the electrical conductor, and comprising a direct current cable termination apparatus for terminating the cable, characterized in that the apparatus comprises the features according to claim 1.

* * * * *